Patented May 1, 1928.

1,668,237

UNITED STATES PATENT OFFICE.

HARRY L. FISHER, OF LEONIA, NEW JERSEY, ASSIGNOR TO THE B. F. GOODRICH COMPANY, OF NEW YORK, N. Y., A CORPORATION OF NEW YORK.

RUBBER COMPOSITION AND METHOD OF PRODUCING THE SAME.

No Drawing. Application filed April 14, 1924, Serial No. 706,267. Renewed March 14, 1928.

This invention relates to compositions of matter made from or containing rubber and more specifically to heat plastic derivatives of rubber.

Various heat plastic derivatives of rubber are described in my three copending applications, Serial No. 616,178, filed January 31, 1923; Serial No. 686,202, filed January 14, 1924, and Serial No. 686,899, filed January 17, 1924, which respectively described the products of reaction, under the influence of heat, of rubber with sulfonyl chlorides, sulfonic acids and sulfuric acid. In general heat plastic derivatives may be prepared from rubber by reacting thereon with a sulfuric acid or with a reagent containing the grouping R—$SO_2$—X, wherein R is an organic radical and X represents chlorine or a hydroxy group. The physical properties of the products described in said applications are shown to vary with the percentage of reagents used and with the conditions of heat treatment, some of the products resembling balata and others resembling shellac. The reaction products of rubber with sulfonic acids and sulfonyl chlorides are described as heat plastic compositions having when heated a gradual transition from the solid to the liquid state without a sharp melting point, being in this as well as in other ways similar to shellac.

Such sulfonic acid or sulfonyl chloride derivatives of rubber may be mixed with the proper fillers, stiffeners or lubricants and molded to form articles such as phonograph records, the rubber derivatives replacing shellac for this purpose. I find that in some instances record tablets so prepared, however, have a surface tack and tend to adhere to the fingers. By preparation of the rubber plastics at various temperatures or with varying amounts of reagent, the physical properties may be varied to avoid tackiness, but thereby the plastic may attain such a high softening point as to make it unsuitable for record molding or it may be so resilient that it will not grind to a powder and cannot be properly mixed with the necessary ingredients.

The general object of this invention is to provide improved heat-plastic derivatives of rubber, such, for example, as will be suitable for use as shellac substitutes in molded compositions. More specific objects are to provide heat plastic derivatives of rubber which grind easily at ordinary temperatures, flux easily on hot rubber mills, and mold readily to a non-tacky product. Further objects are to provide phonograph record compositions without the use of shellac as an ingredient, adapted to produce records free from surface tack, having a pleasing tone and substantially free from undesirable noises due to scratching of the needle.

I find that the presence of sulfuric acid materially modifies the reaction between rubber and a sulfonic acid or a sulfonyl chloride. The reaction product is thereby made substantially free from tackiness. The reaction product is distinctly more uniform throughout, being free from rubbery or balata-like material, and therefore grinds easier and mixes more uniformly with other ingredients and pigments. By the use of sulfuric acid alone it has not been possible to prepare a shellac-like derivative of rubber, while the sulfonic acid and the sulfonyl chloride products have certain disadvantages as above stated, but by the combined us of sulfuric acid and a sulfonic acid or a sulfonyl chloride there may be produced a product of exceptional value as a shellac substitute.

*Example I.*—Rubber—100, p-toluene sulfonic acid—8, sulfuric acid (sp. gr. 1.84)—2 and water—2 (parts by weight) are mixed by masticating the rubber and gradually adding the ingredients previously stirred together. After these ingredients have been added, the rubber is repeatedly forced through tight rolls to insure homogeneity. The mixing time required for a 10 pound batch is about 30 minutes. The mix is then heated for 7½ hours at an oven temperature of 190° F., followed by 10 hours at 266° F. An exothermic reaction takes place. Water and sulphur dioxide as well as other vapors are given off. The weight loss approximates 7%.

Commercial p-toluene sulfonic acid contains various impurities, chiefly sulfuric acid and moisture. Such impurities are to be considered where uniformity of product is desired. A p-toluene sulfonic acid crystallized from sulfuric acid and containing 9% sulfuric acid with 18% moisture, would be compounded to reproduce the above example in the proportions of rubber—90, sulfonic acid—10, sulfuric acid—1 (parts by weight).

The presence of more or less moisture is of little effect except to vary the time of heating of the mix or to aid in mixing the two acids into the rubber. I find, irrespective of the moisture, a desirable ratio of rubber, p-toluene sulfonic acid and sulfuric acid to be 100:8:2. These ratios, however, may be varied according to the properties desired in the final product. Increase of sulfuric acid content tends to raise the softening temperature of the final plastic and renders the product more brittle.

The time and temperature of heating are also variable depending not only on composition of the mix but even to a greater degree on the size of batch which is placed in the heater. A one pound batch in the heater may reach an internal temperature of 300° F. due to exothermic reaction, a 10 pound batch in the same oven may reach 400° F., and a 25 pound batch may rise as high as 500° F., the oven temperature being as given in the above example.

The temperature reached during the reaction is also dependent on the shape of the batch. A 10 pound batch sheeted ½ inch thick, for example, will not reach as high a temperature as when heated in lump form. The physical properties of the final product, however, are dependent to a far greater degree on the composition of the mix than on the temperature of the mass during the heating.

In the manufacture of phonograph records or other molded articles, it is desirable to use compositions which will flow rapidly and easily, when hot molded, so as to reduce the time necessary for molding. For shellac record tablets or similar molded articles, it has been customary to use certain lubricants, softening agents or fluxes such as paraffin, ceresin, stearic acid or the like. I find these materials, in general, to be equally desirable in molding compositions containing shellac-like derivatives of rubber.

In the following example, the reaction product of rubber with a mixture of sulfuric and sulfonic acids will be referred to by the term "plastic A".

*Example II.*—A non-tacky molding composition suitable for such purposes as preparing phonograph records, having desirable physical properties, such as easy molding, desirable tone qualities and resistance to needle abrasion is prepared by grinding together plastic A—350, iron oxide—410, gas black—150, cotton flock—50, benzidine—20 (parts by weight). The powdered mixture is then placed on a hot rubber mill and fluxed into a continuous sheet. There is then added stearic acid—20 (parts by weight). After proper mixing and refining on a tight mill the hot batch is sheeted to the proper thickness and blanks for record molding are cut therefrom, cooled and stored for later use in the record presses. For molding records, the blanks are warmed on a hot table heated by steam at 110–120 pounds pressure, transferred to a record molding press heated to approximately the same temperature and the press closed with hydraulic pressure. Immediately after closure of the press, the steam is turned off and the matrices cooled with running water. The press is then opened, the record tablet removed and steam turned on preparatory to the next molding operation.

The various pigments or ingredients in the above record compositions may be widely varied in proportions, as well as replaced by many other materials and the procedure above described may be variously modified in other respects without departing from the scope of my invention, wherefore I do not wholly limit my claims to the specific ingredients or proportions given, or to the exact procedure described.

The term sulfonic acid as used herein and as included in the generic formula is intended to include only free sulfonic acids and to exclude so-called sulfonic acids whose acidity is internally or otherwise compensated by the presence of basic or salt-forming groups.

The present invention is an improvement upon those of my copending applications Serial No. 616,178, filed January 31, 1923, Serial No. 686,202, filed January 14, 1924, and Serial No. 686,899, filed January 17, 1924.

I claim:

1. The method of producing a composition of matter which comprises dispersing through rubber a mixture of sulfuric acid and a reagent having the general formula R—SO$_2$—X, wherein R is an organic radical and X represents chlorine or a hydroxy group, and heating the resulting mixture to a reaction temperature.

2. The method of producing a composition of matter which comprises dispersing through rubber a mixture of sulfuric acid and a sulfonic acid, and heating the resulting mixture to a reaction temperature.

3. The method of producing a composition of matter which comprises dispersing through rubber a mixture of sulfuric acid and p-toluene sulfonic acid, and heating the resulting mixture to a reaction temperature.

4. The method of producing a composition of matter which comprises mixing rubber with a reagent containing the grouping R—SO$_2$—X, wherein R is an organic radical and X represents chlorine or a hydroxy group, and with sulfuric acid, said ingredients being mixed substantially in the proportions 100:8:2, and heating the mixture for such time and at such temperature as to produce a pronounced exothermic reaction therein.

5. The method of producing a composition of matter which comprises mixing rubber with a sulfonic acid and sulfuric acid, substantially in the proportions of 100:8:2, and heating the mixture for such time and at such temperature as to produce a pronounced exothermic reaction therein.

6. The method of producing a composition of matter which comprises mixing rubber with paratoluene sulfonic acid and sulfuric acid, substantially in the proportions of 100:8:2, and heating the mixture for such time and at such temperature as to produce a pronounced exothermic reaction therein.

7. A composition of matter comprising the product of the reaction under the influence of heat of rubber with a mixture of sulfuric acid and a reagent having the general formula $R-SO_2-X$, wherein R is an organic radical and X represents chlorine or a hydroxy group.

8. A composition of matter comprising the product of the reaction under the influence of heat of rubber and a mixture of sulfuric acid and a sulfonic acid.

9. A composition of matter comprising the products of the reaction under the influence of heat of rubber with a mixture of sulfuric acid and p-toluene sulfonic acid.

10. A composition of matter comprising the reaction product of rubber with a reagent containing the grouping $R-SO_2-X$, wherein R is an organic radical and X represents chlorine or a hydroxy group, and with sulfuric acid, said ingredients being mixed substantially in the proportions 100:8:2, and said mix having been heated for such time and at such temperature as to produce a pronounced exothermic reaction therein.

11. A composition of matter comprising the reaction product of a mixture of rubber, a sulfonic acid and sulfuric acid substantially in the proportions of 100:8:2, said mixture having been heated for such time and at such temperature as to produce a pronounced exothermic reaction therein.

12. A composition of matter comprising the reaction product of a mixture of rubber, paratoluene sulfonic acid and sulfuric acid substantially in the proportions of 100:8:2, said mixture having been heated for such time and at such temperature as to produce a pronounced exothermic reaction therein.

In witness whereof I have hereunto set my hand this 11th day of April, 1924.

HARRY L. FISHER.